United States Patent
Cook et al.

(10) Patent No.: US 10,359,905 B2
(45) Date of Patent: Jul. 23, 2019

(54) COLLABORATION WITH 3D DATA VISUALIZATIONS

(71) Applicant: HEWLETT PACKARD ENTERPRISE DEVELOPMENT LP, Houston, TX (US)

(72) Inventors: Gregory W. Cook, Palo Alto, CA (US); Chih-Pin Hsiao, Chamblee, GA (US); Jishang Wei, Palo Alto, CA (US); Mithra Vankipuram, Palo Alto, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/534,258

(22) PCT Filed: Dec. 19, 2014

(86) PCT No.: PCT/US2014/071619
§ 371 (c)(1),
(2) Date: Jun. 8, 2017

(87) PCT Pub. No.: WO2016/099563
PCT Pub. Date: Jun. 23, 2016

(65) Prior Publication Data
US 2017/0344220 A1    Nov. 30, 2017

(51) Int. Cl.
*G06F 3/01* (2006.01)
*G06F 3/03* (2006.01)
(Continued)

(52) U.S. Cl.
CPC .......... *G06F 3/04815* (2013.01); *G06F 3/011* (2013.01); *G06F 3/013* (2013.01);
(Continued)

(58) Field of Classification Search
CPC .. G06F 3/04815; G06F 3/017; G06F 3/04842; G06F 3/013; G06F 3/0488;
(Continued)

(56) References Cited

U.S. PATENT DOCUMENTS

| 5,838,973 | A | * | 11/1998 | Carpenter-Smith ...... G06F 8/34 717/105 |
| 6,624,833 | B1 | * | 9/2003 | Kumar .................... G06F 3/017 345/156 |

(Continued)

FOREIGN PATENT DOCUMENTS

WO    2008106196    9/2008

OTHER PUBLICATIONS

Wang, R., Paris, S., & Popović, J. (2011). 6D hands: markerless hand-tracking for computer aided design. In Proceedings of the 24th annual ACM symposium on User interlace software and technology (pp. 549-558). New York, NY, USA: ACM. doi:http://doi.acm.org/10.1145/2047196.2047269.

(Continued)

*Primary Examiner* — Ariel A Balaoing

(57) ABSTRACT

An example collaboration system is provided in according with one implementation of the present disclosure. The system includes a 3D display a 3D data visualization, at least two hand avatars of two different users, and a view field avatar. The system also includes a plurality of auxiliary computing devices and a behavior analysis engine to perform a behavior analysis of a user. The behavior analysis engine is to: determine an attention engagement level of the user, and determine a pose of the user in relation to the auxiliary computing device. The system further includes an intention analysis engine to determine an intention of the user in relation to the 3D visualization based on the user's attention engagement level and the user's pose, and a collaboration engine to implement an action with the 3D (Continued)

data visualization by using a hand avatar based on the user's intention and an identified gesture.

13 Claims, 9 Drawing Sheets

(51) Int. Cl.
*G06K 9/00* (2006.01)
*G06T 13/40* (2011.01)
*G06T 19/00* (2011.01)
*G06F 3/0354* (2013.01)
*G06F 3/0481* (2013.01)
*G06F 3/0484* (2013.01)
*G06F 3/0488* (2013.01)

(52) U.S. Cl.
CPC ............ *G06F 3/017* (2013.01); *G06F 3/0304* (2013.01); *G06F 3/03547* (2013.01); *G06F 3/04842* (2013.01); *G06K 9/00355* (2013.01); *G06T 13/40* (2013.01); *G06T 19/00* (2013.01); *G06F 3/0488* (2013.01); *G06F 2203/04808* (2013.01); *G06T 2219/024* (2013.01)

(58) Field of Classification Search
CPC ........... G06F 2203/04808; G06T 13/40; G06T 9/00355; G06K 9/00355
See application file for complete search history.

(56) References Cited

U.S. PATENT DOCUMENTS

| | | | |
|---|---|---|---|
| 2007/0248261 A1 | 10/2007 | Zhou et al. | |
| 2009/0119593 A1* | 5/2009 | Hallock | G06F 3/0425 715/719 |
| 2009/0150802 A1* | 6/2009 | Do | G06F 3/011 715/757 |
| 2009/0254842 A1 | 10/2009 | Leacock et al. | |
| 2010/0302015 A1* | 12/2010 | Kipman | G06F 3/011 340/407.1 |
| 2010/0332998 A1 | 12/2010 | Sun et al. | |
| 2011/0304632 A1 | 12/2011 | Evertt et al. | |
| 2012/0054281 A1 | 3/2012 | Westmoreland | |
| 2012/0062758 A1* | 3/2012 | Devine | G01S 5/00 348/222.1 |
| 2012/0162384 A1* | 6/2012 | Vesely | G06T 19/006 348/47 |
| 2013/0073619 A1 | 3/2013 | Tumuluri | |
| 2014/0104206 A1 | 4/2014 | Anderson | |

OTHER PUBLICATIONS

Pang, A., & Wittenbrink, C. (1997). Collaborative 3D visualization with CSpray. IEEE Computer Graphics and Applications, 17(2), 32-41.

Tang, A., Tory, M., Po, B., Neumann, P., & Carpendale, S. (2006). Collaborative Coupling over Tabletop Displays. In Proceedings of the SIGCHI Conference on Human Factors in Computing Systems (pp. 1181-1190). New York, NY, USA: ACM. doi:10.1145/1124772. 1124950.

Coldefy, F., & Louis-dit-Picard, S. (2007). DigiTable: an interactive multiuser table for collocated and remote collaboration enabling remote gesture visualization. In Computer Vision and Pattern Recognition, 2007. CVPR '07. IEEE Conference on (pp. 1-8). doi:10. 1109/CVPR.2007.383471.

Vankipuram, A., Khnal, P., Ashby, A., Vankipuram, M., Gupta, A., DrummGurnee, D., Josey, K., and Smith, M. Design and Development of a Virtual Reality Simulator for Advanced Cardiac Life Support Training. IEEE Journal of Biomedical and Health Informatics, vol. 18, No. 4, Jul. 2014.

Bergh, M.V.D. et al.; "A Novel Camera-based System for Collaborative Interaction with Multi-dimensional Data Models"; Nov. 5-6, 2009 ; http://www.mvdblive.org/research/eth_biwi_00712.pdf.

Otmane, S. et al.; "Collaborative 3D Interaction in Virtual Environments: a Workflow-based Approach"; Mar. 16, 2014 ; http://cdn. intechopen.com/pdfs-wm/13644.pdf.

PCT; "International Search Report"; cited in PCT/US2014/071619; dated Aug. 26, 2015; 4 pages.

* cited by examiner

COLLABORATION WITH 3D DATA VISUALIZATIONS

BACKGROUND

Interactive devices and systems continue to play an important role today. Some of these devices and systems may display three-dimensional ("3D") virtual objects (also called 3D visualizations). Organizations and individuals regularly use different types of interactive devices and systems in various areas and for different applications.

DETAILED DESCRIPTION OF SPECIFIC EXAMPLES

Figure 1:
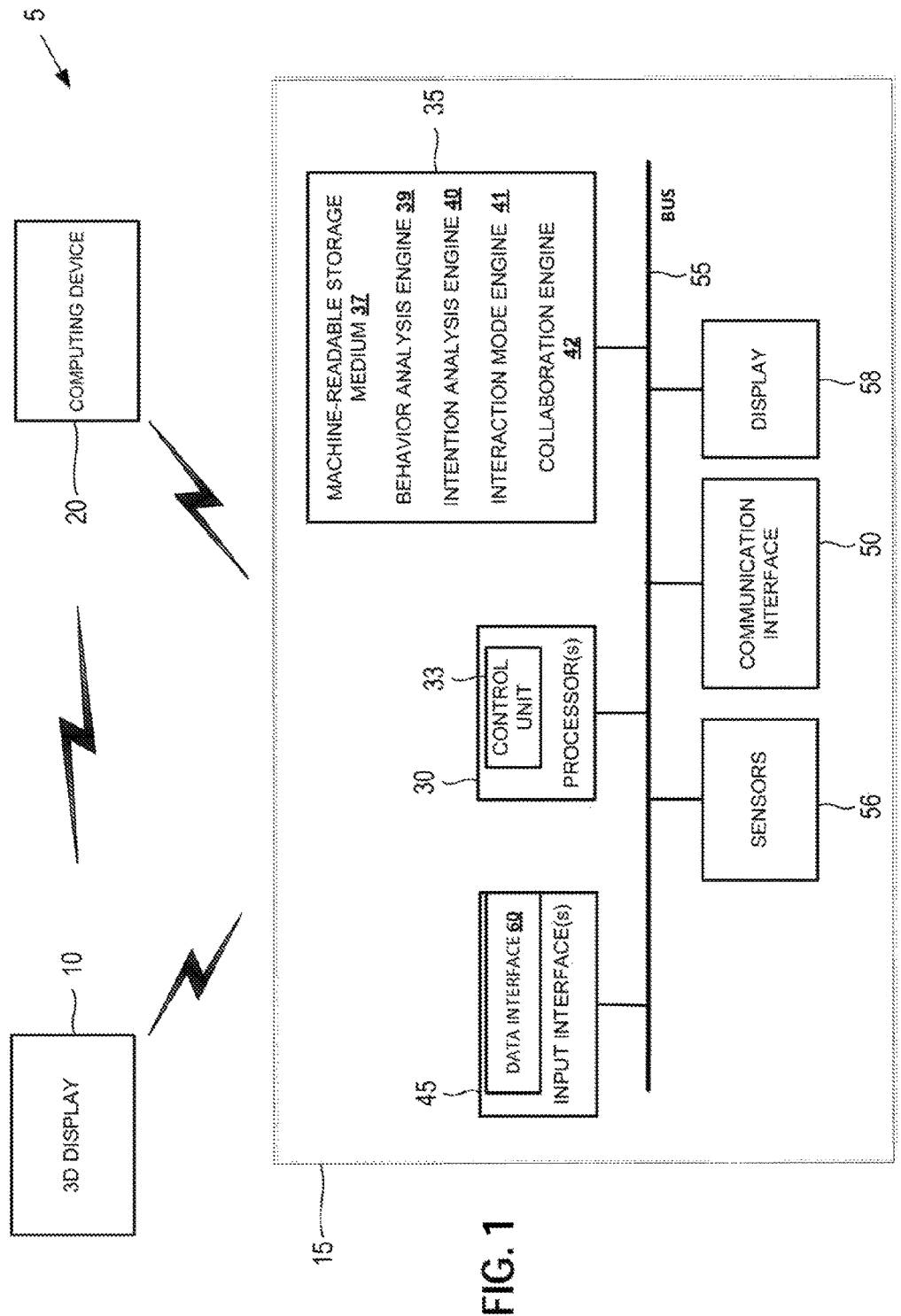
FIG. 1 is a schematic illustration of an example interactive collaboration system in accordance with an implementation of the present disclosure.

As noted above, with the recent improvements in technology, interactive devices and systems (i.e., devices and systems that may display visual objects and allow for user interaction) are becoming increasingly popular in all industries. Interactive devices and systems come in different sizes, forms, and may include different technical features. Different users rely on different type of interactive devices or systems for many day-to-day activities and work related tasks. As used herein, the terms "user" and "collaborator" may be used interchangeably and may refer to any type of individual, organization group, business, or any other party that may need to operate or communicate with an interactive device or a system.

Due to the proliferation of various electronic devices, the technological capabilities of interactive systems are continuously changing and increasing. Some of these devices and systems may be capable of displaying 3D visualizations (also called virtual objects). As used herein, the terms "3D visualization" and "virtual object" are to be used interchangeably and refer to any type of 3D image or 3D formation that may be displayed and viewed. In some examples, these 3D visualizations may include different types of data represented in an interactive form. As a result, these interactive devices and systems may be widely used by organization, businesses, or individual users.

In many situation, users of these interactive systems do not share the same physical location (e.g., same room, etc.). However, distant users may still wish to jointly explore the same view of 3D data visualizations while maintaining their own view field. In such scenarios, virtual collaboration systems that support 3D data visualizations may be useful. Such collaboration systems may allow users to gain the full benefit of 3D data visualizations, and to be able to view, interact, and perform actions with the displayed 3D visual data objects. As used herein, the term "view field" refers to the users view (i.e., location, orientation, etc.) of the 3D data visualizations shown by these interactive systems, where the view field of the user may change but the (perceived) 3D data object's location and orientation remain stationary.

In general, 3D data visualizations have different interaction requirements as compared to scientific visualizations and, therefore, they require a unique collaboration system. First, as compared to scientific visualizations, there is no "a priori" knowledge about the best way to view a 3D data visualization, since there is no physical process or characteristics that are normally used to characterize the best viewing direction. Consequently, having the freedom to look at a 3D virtual object from different directions and also direct potential collaborators to look in the "same" direction is an important capability. Second, because the problems of occlusion are much more apparent in information visualization (due to the lack of a physical model) it is important that the capability exists to be able to annotate directly on the 3D data object. Third, very often 3D information visualizations spark further questions which typically lead to overlaying more data to provide context and contrast. In order to "queue up" this information, it may be desirable to establish a private space and then have a procedure to publish to a collaborative/public space when necessary.

Another problem with the available 3D interaction devices and systems is that they may not offer accurate and efficient ways for users to interact with or navigate the 3D visualizations. In some situations, the existing systems and techniques for operating these systems and connecting with the 3D virtual data objects are too complex and cumbersome. For example, the interactive systems may use conventional input sources (e.g., mouse, keyboard, etc.) that are difficult to operate when interacting with 3D virtual data objects. Further, existing systems cannot automatically adapt to the user's behavior and may take a long time to switch between different interaction modes. As used herein, the term "interaction mode" refers to different methods for operating or manipulating 3D data objects in an interaction system, including but not limited to: navigation, pointing, annotation, saving, selection, highlighting, filtering, zooming, storing, quantitative measurement, querying, historical path, etc. For example, an interaction mode may define the commands that an interaction system should expect and execute in relation to interacting with 3D objects displayed by the system.

Due to the encumbrances described above, the learning curve of operating such systems and interacting with 3D objects may be significantly extended and that makes these systems less desirable for users. Therefore, improved 3D data systems and techniques for collaborative interacting with 3D data visualizations are desired. These systems may adapt to user's behavior and intent and may provide more transparent and intuitive ways for navigating in 3D spaces and manipulating 3D data objects in these virtual spaces. This will increase the effectiveness, efficiency and user satisfaction with such interactive systems.

The present description is directed to an improved solution that automatically adapts to the user's behavior and, therefore, allows for better and more efficient collaborative interaction with 3D data visualizations. In one example, a collaboration system that supports 3D data visualizations may include a 3D display displaying 3D a virtual data object, hand avatars of two different users, and a view field avatar. The system may further include a plurality (e.g., at least two) of computing device (e.g., tablets) having a touch panel (e.g., a multi-touch display), and a plurality of sensors connected to the computing device. As used herein, the term "hand avatar" refers to an object in the 3D virtual space that may be controlled by a user of the system. As used herein, the term "view field avatar" refers to an object in the 3D virtual space that represents the view field of a user of the system.

In one example, a processor of a system may identify an intention of a user of a collaboration system in relation to a 3D virtual data object. In one example, the intention of user may be identified based on an attention engagement level of the user and determine a pose of the user in relation to a computing device (e.g., how the user's hands hold the computing device she is using). The processor may then transition the system to an interaction mode based on the identified user intention and nay execute an action with the 3D virtual data object by using a hand avatar based on the interaction mode and an identified gesture Thus, the combination of elements in the proposed collaboration system may allow the system to evaluate the user's intentions (i.e., future behavior), to transition to an appropriate interaction mode based on the intentions, and to execute desired actions with hand avatars to manipulate a 3D visualization while sharing the view of the 3D visualization between several users or collaborators. Using hand avatars and view field avatars improves interaction, navigation, pointing and selection of 3D data objects by providing a natural collaborative interface between collaborators using intuitive gestures. The proposed collaborative environment may use public visualization workspaces and private visualization workspaces to, for example, facilitate development of 3D contextual information.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description ad should not be regarded as limiting. The use of "including," "comprising" or "having" and variations thereof herein is meant to encompass the items listed thereafter and equivalents thereof as well as additional items.

Furthermore, the term "based on," as used herein, means "based at least in part on." It should also be noted that a plurality of hardware and software based devices, as well as a plurality of different structural components may be used to implement the disclosed methods and devices.

Referring now to the figures. FIG. 1 is a schematic illustration of an example interactive collaboration system 5. The illustrated system 5 is capable of carrying out the techniques described below. As shown in FIG. 1, the system 5 is depicted as including at least one 3D display 10 (e.g., a stereoscopic display) and a plurality of auxiliary computing devices 15 and 20. Computing devices 15 and 20 may be used by different users of the system 5 and may not be similar devices. Although only computing devices 15 is described in details below, it is to be understood that computing device 20 may have similar elements and functions.

The 3D display 10 may display at least one 3D visualization (not shown) that can include any type of 3D object (e.g., data, text, media, etc.). In one example, the 3D object may be shown on physical surface or screen (not shown) of the 3D display 10. In another example, the 3D object may appear floating in 3D space defined around (e.g., in front, in back, on top, on side, etc.) the 3D display 10 (not shown).

In one implementation, the computing device 15 may be a portable computing device (e.g., a tablet, a laptop, a srnartphone, a personal digital assistant (PDA), etc.). Therefore, the collaboration system 5 may involve multiple users where each user "brings" a separate computing device for collaboration and simultaneous interaction with the 3D data objects on the display 10. The users of the system may or may not be located at the same physical location (e.g., same room or office. Thus, in another implementation, the system 5 may include a plurality of 3D displays such that all remote users may share the same view of the 3D data object and may collaboratively interact with these 3D data objects.

The computing device 15 may include at least one processor 30, a memory 35, a plurality of engines 39-42, an input interface(s) 45, a communication interface 50, a plurality of sensors 56, and a multi-touch display panel 58. As explained in additional details below, the display 58 may show 3D virtual data objects, hand avatars of different users, and at least one view field avatar (not show in FIG. 1), In another implementation, the computing device 15 may be a personal computer, an all in one computing device, a gaming console, a server, a visual player, an electronic notepad, a plurality of distributed computing devices, or any other suitable computing device that includes a processor, a plurality of sensors and a multi-touch display. In the implementation where the computing device 15 is not a portable device, a plurality of sensors (e.g., inertial sensors) may be attached to, the hands of the user of the system 5.

In other examples, the computing device 15 may include additional components and some of the components depicted therein may be removed and/or modified without departing from a scope of the system that allows for carrying out the functionality described herein. It is to be understood that the operations described as being performed by the processor 30 of the computing device 15 that are related to this description may, in some implementations, be performed by a processor in the 3D display 10, a processor of the device 20, an external processor (not shown), or distributed between the computing device 15 and other electronic/computing devices (not shown).

As explained in additional details below, the computing device 15 may include software, hardware, or a suitable combination thereof configured to enable functionality of the computing device 15 and to allow it to carry out the techniques described below and to interact with the one or more systems or devices. The computing device 15 may include communication interfaces (e.g., a Wi-Fi® interface, a Bluetooth® interface, a 3G interface, a 4G interface, a near field communication (NFC) interface, etc) that are used to connect with other devices/systems and/or to a network (not shown). The network may include any suitable type or configuration of network to allow for communication between the computing device 15, the 3D display 10, and any other devices/systems (e.g., other computing devices, displays, etc.).

The processor 30 of the computing device 15 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device), the memory 35, the engines 39-42, the input interfaces 45, the communication interface 50, the plurality of sensors 56, and the multi-touch display panel 58 may be operatively coupled to a bus 55. The processor 30 may be suitable to retrieve and execute instructions stored in machine-readable storage medium 37. Processor 30 can include single or multiple cores on a chip, multiple cores across multiple chips, multiple cores across multiple devices, or combinations thereof. The processor 30 may include at least one controller 33 and may be implemented using any suitable type of processing system where at least one processor executes computer-readable instructions stored in the memory 35.

The communication interface 50 may allow the computing device 15 to communicate with plurality of networks, communication links, and external devices. The input interfaces 45 may receive information from devices/systems in communication with the computing device 15. In one example, the input interfaces 45 include at least a data interface 60 that may receive data from any external device or system.

The memory 35 may include any suitable type, number, and configuration of volatile or non-transitory machine-readable storage media 37 to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), magnetoresistive random access memory (MRAM), memristor, flash memory, SD card, floppy disk, compact disc read only memory (CD-ROM), digital video disc read only memory (DVD-ROM), and other suitable magnetic, optical, physical, or electronic memory on which software may be stored. The memory 35 may also be used for storing temporary variables or other intermediate information during execution of instructions to by the processor 30.

The computing device 15 may include various engines 39-42. Each of the engines 39-42 may include, for example, at least one hardware device including electronic circuitry for implementing the functionality described below, such as control logic and/or memory. In addition or as an alternative, the engines 39-42 may be implemented as any combination of hardware and software to implement the functionalities of the engines. For example, the hardware may be a processor and the software may be a series of instructions or microcode encoded on a machine-readable storage medium and executable by the processor. Therefore, as used herein, an engine may include program code, e.g., computer executable instructions, hardware, firmware, and/or logic, or combination thereof to perform particular actions, tasks, and functions described in more detail herein in reference to FIGS. 2-11.

The behavior analysis engine 39 may perform a behavior analysis of a user by using data from the plurality of sensors 56. For instance, the behavior analysis engine 39 may receive data from the sensors 56 and process the data to evaluate the behavior of the user. In one example, the behavior analysis engine 39 may determine an attention engagement level of the user (i e., how engaged is the user with the elements of the system 5) and a pose of the user in relation to an auxiliary computing device 15 (i.e., how the user's hands hold the device 15). As explained in additional details below, the results from the behavior analysis engine 39 may be used to determine the interaction mode of the system 5 (i.e., what command should the system be expecting and what actions should be executing at the moment).

In one example, the intention analysis engine 40 may determine an intention of the user in relation to at least one 3D visualization based on the user's attention engagement level and the user's pose. For instance, according to the user's behavior detected by the behavior analysis engine 39, the system may determine what are the intentions of the user in relation to a 3D object (e.g., user is about to explore an object, select an object, measure distance, etc.). The interaction mode engine 41 may automatically adjust the system 5 to an interaction mode based on the identified user intention. For example, the system 5 may adapt (e.g., adjust settings, etc.) to the predicted behavior of the user.

The collaboration engine 42 may implement an action (e.g., selection, navigation, etc.) with the 3D data visualization by using a hand avatar based on the user's intention and an identified gesture. In one example, the system may use the hand avatars to recognize user inputs provided through gestures, and may perform a specific action based on the gesture and the previously selected interaction mode.

The plurality of sensors 56 may include different types of sensors that define a gestural interaction space (not shown) around the computing device 15. In one example, the sensors may include at least one optical depth sensor (e.g., stereo correlator, structured light, time-of-flight, etc.) positioned on the computing device 15 for scanning or collecting information from an environment around the device 15. The optical depth sensors may assist with recognizing the position of the computing device and identifying of various hand gestures of a user. In some implementations (e.g., when the device 15 is too thin and can't accommodate sensors), the system 5 may include a removable jacket (not shown) attachable to the computing device 15 to include the optical, depth sensors. The removable jacket may have any form or size that fits the computing device 15.

In addition, the system 5 may include at least one passive optical sensor (e.g., a camera, etc.) positioned on the computing device 15 for scanning or collecting information from an environment around the device 15. The passive optical sensor may provide visual feedback of a user (e.g., eyes, head detection, etc.). The system 5 may also include a plurality of inertial sensors (e.g., accelerometers, gyroscopic sensors, magnetometers, etc.) positioned on the computing device 15 that may recognize movement and position of the computing device and hand position of the user (e.g., by the orientation/angle of the device 15).

The display panel 58 may be an LCD (Liquid Crystal Display), OLED (organic light emitting display) or another type of display. In one example, the display 58 may be a multi-touch display that can be controlled by the user through simple or multi-touch gestures. The display 58 may include any suitable touch-sensitive display technology that may be used for detecting touches on the touch-sensitive display. In some implementations, the display 58 may include at least one of a prismatic film (e.g., for glasses free operation) and a polarizing film (for use with passive optical glasses) attached to a top surface of the computing device 15 and covering, the multi-touch display. In some examples, the film may be added to a jacket for the computing device 15. Having a prismatic film or a polarizing film on the display 58 may allow a user to view 3D visualizations on the computing device 15 and to move these 3D visualizations to the 3D display 10.

Figure 2:
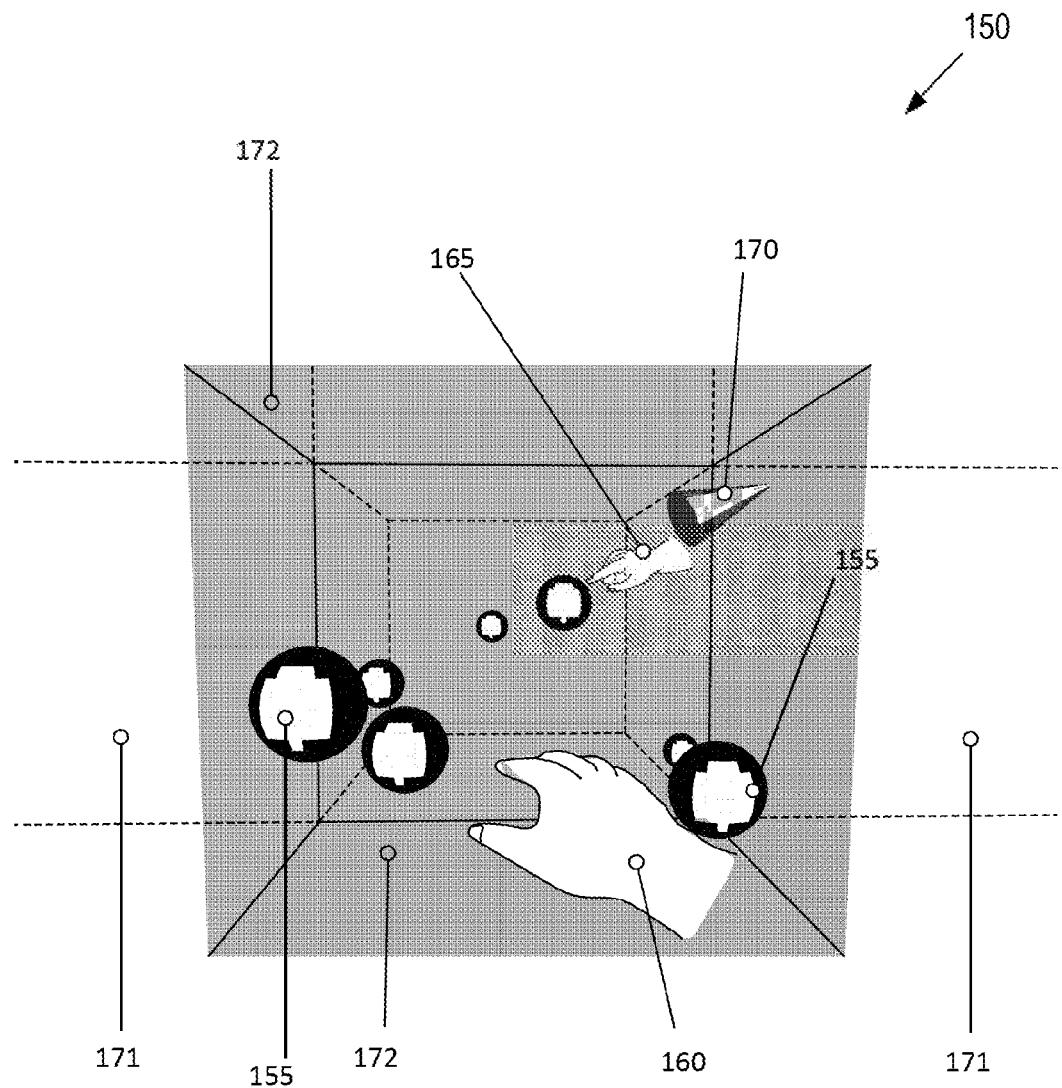
FIG. 2 illustrates a view field of a user showing 3D data visualizations displayed by the system of FIG. 1 in accordance with an example implementation of the present disclosure.

FIG. 2 illustrates a view field 150 of a user showing 3D data visualizations displayed by the system 5. The view field 150 may represent the view of one of the users of the 3D data visualizations shown by the system 5. The view field 150 may show at least one 3D virtual data object 155, hand avatars 160/165 of at least two different users, and a view field avatar 170 of at least one user. The view field 150 may also show a private visualization workspace 171 and a public visualization workspace 172 for the users of the system. Hand avatars 16/165 may be virtual objects that may be controlled by two different users of the system. In one example, hand avatar 160 may be of a first user (e.g., the user which view field is shown in FIG. 2) and hand avatar 150 may be of a collaborator. The view field avatar 170 may be of the collaborator user and may represent a collaborator's view field of the 3D data visualizations 155, including viewpoints and orientations of the view A view field avatar is a virtual representation of a user/collaborator view field and may give the other collaborators indication of where the owner of the view field avatar is working at, which part of the 3D data she is focusing on, etc.

The hand avatars 160/165 may be controlled by the users of the collaboration system to interact with each other, with other avatars (e.g., view field avatars), and/or with the 3D data, visualizations in the virtual space. In one example, the hand avatars may be controlled by the user's hand, by an input device (e.g., a mouse), voice, chat, or other means of interaction. When a hand avatar is associated with an actual hand of the user, the hand avatar may emulate the actual movement of the user's hand. For instance, a user may control their avatar hands to reflect all the movements and rotations of the joints and the bones on user's real hands in the collaboration space. These motions may be acquired by the different sensors 56 of the system.

Using avatar hands in 3D data visualizations collaboration system has many advantages. The movements of the avatar hands may become the contextual hints of the activities to other collaborators. During discussions between collaborators, these avatar hands may convey the ideas that are difficult through speech. As described below, the avatar hands may execute, gesture commands and actions that can facilitate the discussions and collaborations when exploring the visualizations together.

The private visualization workspace 171 is a space where users may manipulate 3D visualizations without sharing their actions with other users (i.e., the actions are not seen by other users). If other collaborators are interested in entering in the private workspace, they may need to gain permission from the owner of the workspace. Since different users would have different types of visualizations in their private spaces, shared and public visualizations may be converted to customized visualizations when sending the visualization from one space to another. The public visualization workspace 172 includes shared data visualizations where any of the collaborators may manipulate the 3D virtual objects, facilitate collaborations, communications, etc. A public workspace may connect to other public workspaces and private workspaces. As show in FIG. 2, in some examples, the private workspace 171 may extend beyond the limits of the public workspace.

Visualizations workspaces 171/172 may facilitate collaboration between different users and/or locations for exploring 3D data visualizations. A private workspace may be connected to public workspaces to form a work environment where the users can share the interesting findings among the different workspaces. As shown in FIG. 2, private and public workspaces may be interconnected so that the users can move between the workspaces for collaborations based on their privileges. For example, a user may perform a gesture to select 3D data visualizations and move them into a private spaces workspace. Users may also move 3D data visualizations from their private workspaces to collaboration workspaces for comparison purposes.

Figure 3:
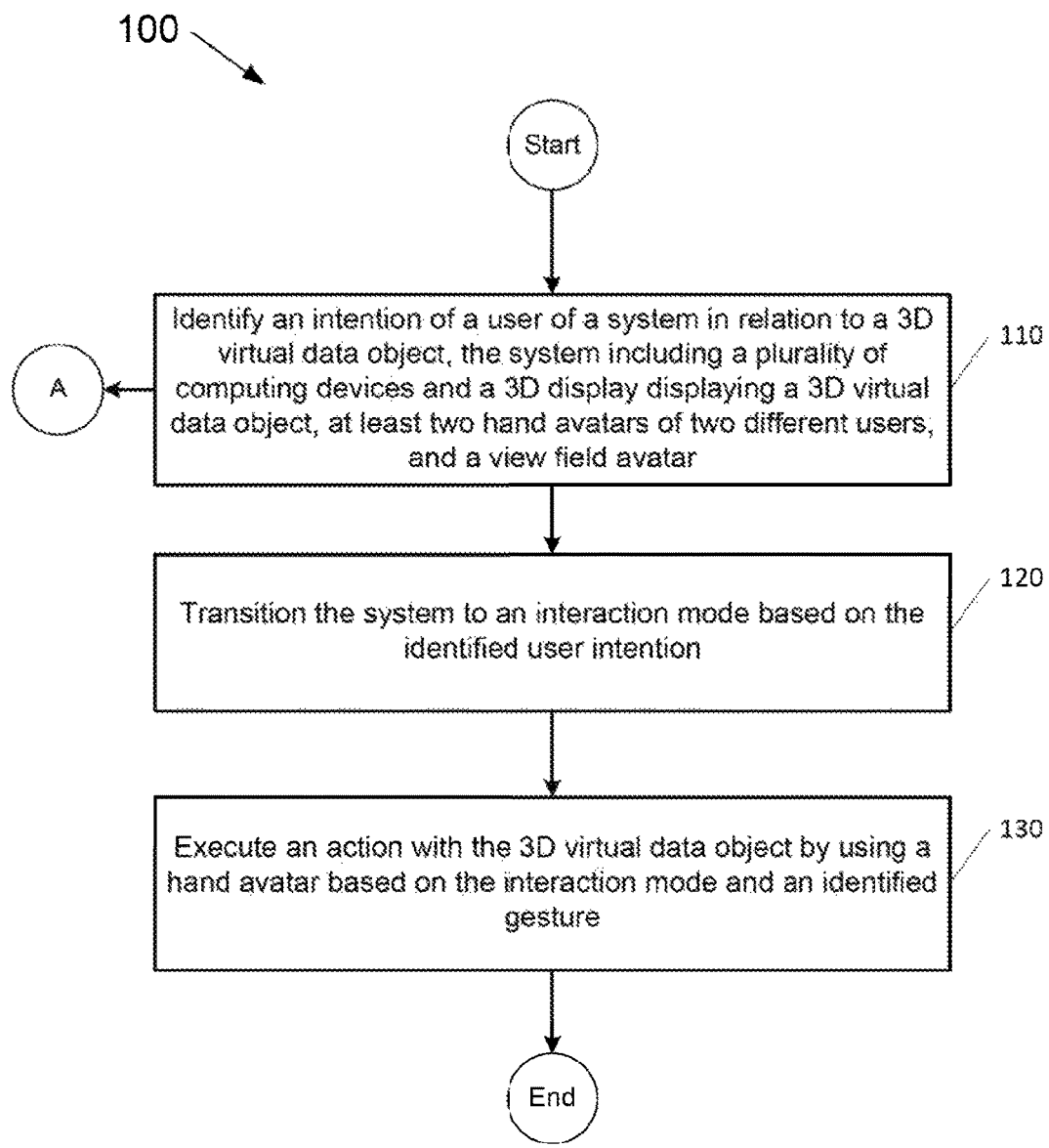
FIG. 3 illustrates a flow chart showing an example of a method for operating an interactive collaboration system in accordance with an implementation of the present disclosure.

FIG. 3 illustrates a flow chart showing an example of a method 100 for operating an interactive collaboration system. Although execution of the method 100 is described below with reference to the system 5, the components for executing the method 100 may be spread among multiple devices The method 100 may be implemented in the form of executable instructions stored on a machine-readable storage medium, such as storage medium 37, and/or in the form of electronic circuitry.

In one example, the method 100 can be executed by the processor 30 of the computing device 15. In other examples, the method may be executed by a processor on the 3D display 10, the device 20, or another processor in communication with the system 5. Various elements or blocks described herein with respect to the method 100 are capable of being executed simultaneously, in parallel, or in an order that differs from the illustrated serial manner of execution. The method 100 is also capable of being executed using additional or fewer elements than are shown, in the illustrated examples.

The method 100 begins at 110, where the processor 30 may identify an intention of a user of the system 5 in relation to a 3D virtual data object. The user of a system may be one of the collaborative users currently using the system to view and interact with 3D data visualizations. For example, the processor 30 may analyze various data received from the plurality of sensors 56 of the device used by that user to examine the behavior of the user and to determine the user's intention in relation to a 3D virtual object 155. The processor may use various techniques to identify the intention of the user based on the acquired data. One example of such technique is described below in relation to FIG. 4.

At 120, the processor 30 may automatically transition the system 5 to an interaction mode based on the identified user intention. That way, the system 5 may quickly adapt to the predicted behavior of the user, which makes the system self-intuitive and much more appealing to users. The system 5 may implement various interaction modes related to the 3D objects displayed by the system: navigation, pointing, saving, annotation, selection, highlighting, filtering, zooming, storing, quantitative measurement, querying, historical path, etc.

The following list of interaction modes only represents an example of different modes and is not to be viewed as a complete list of all interaction modes that can be implemented by the system. In one example, the processor 30 may transition the system to one of the following interaction modes: a) a selection mode to select at least one 3D visualization by using an hand avatar; b) a navigation mode to navigate the at least one 3D visualization by using an hand avatar; c) a slice and detail mode to create a virtual slicing plane of the at least one 3D visualization to generate a sliced visualization by using an hand avatar; d) a store mode to store at least one 3D visualization on the computing device 15 for displaying it on the 3D display 10; e) a measurement mode to measure elements of at least one 3D visualization or distances between a plurality of 3D visualizations; f) a save interaction mode to save a collaborative view of the 3D data visualization.

Next, the processor 30 may execute an action with the 3D virtual data object 155 by using a hand avatar (e.g., 160, 165) based on the interaction mode and an identified gesture (at 130). Details regarding the techniques used to execute an action with 3D data object are described in the subsequent paragraphs.

Figure 4:
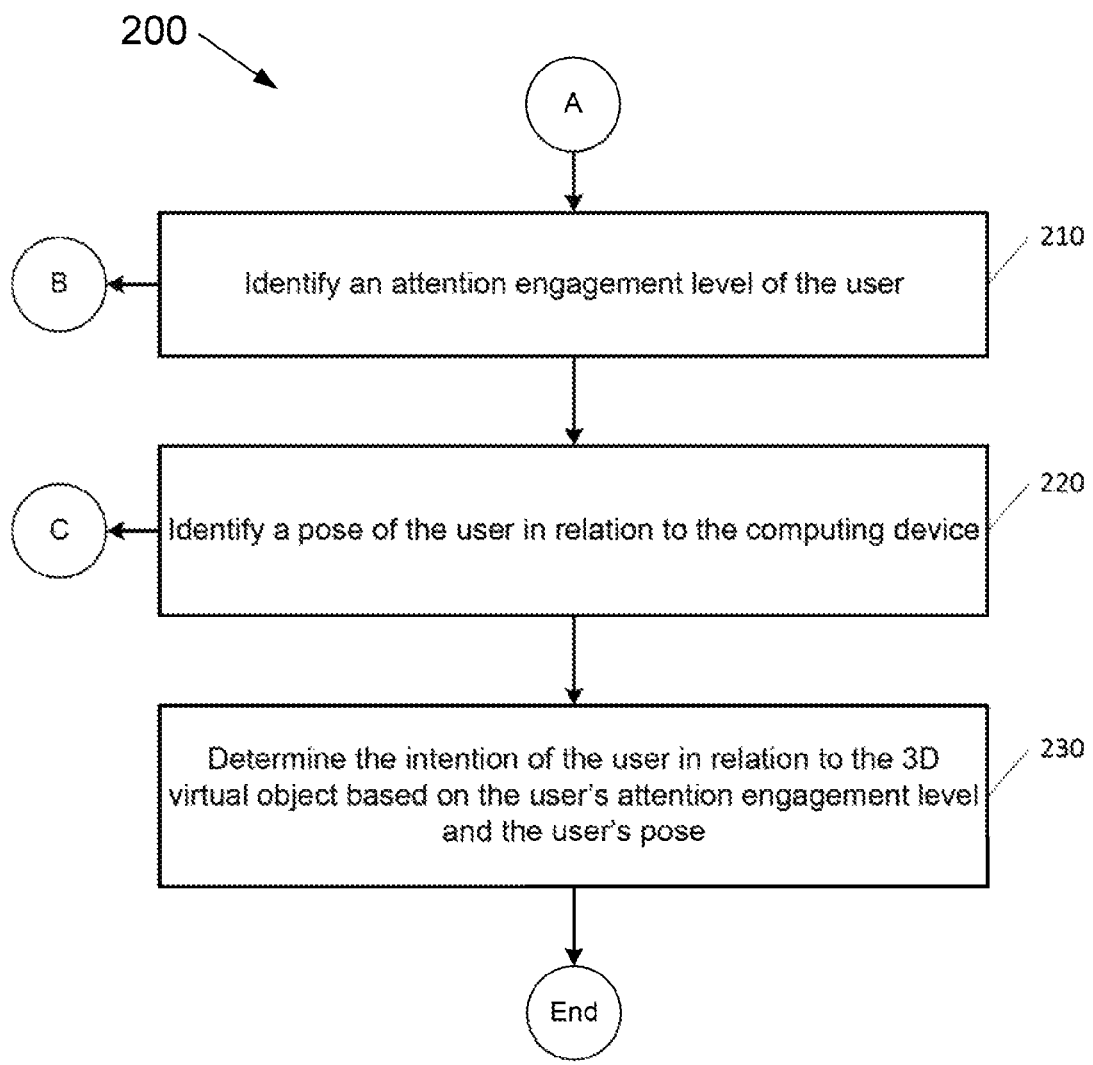
FIG. 4 illustrates a flow chart showing an example of a method for identifying an intention of a user in accordance with an example implementation of the present disclosure.

FIG. 4 illustrates a flow chart showing an example of a method 200 for identifying an intention of a user. In one example, the method 200 can be executed by the processor 30 of the computing device 15. Alternatively, the components for executing the method 200 may be spread among multiple devices.

The method 200 begins at 210, where the processor 30 may identify an attention engagement level of a user. In one example, the attention engagement level may be a real number that indicates the engagement of the user in relation to the elements of the system 5 (e.g., the computing device used by the user and the display 10). Since each collaborator may use her individual computing device, the analysis related to identifying an intention of a user may be related to the specific computing device (e.g., device 15) used by each user.

Figure 5:
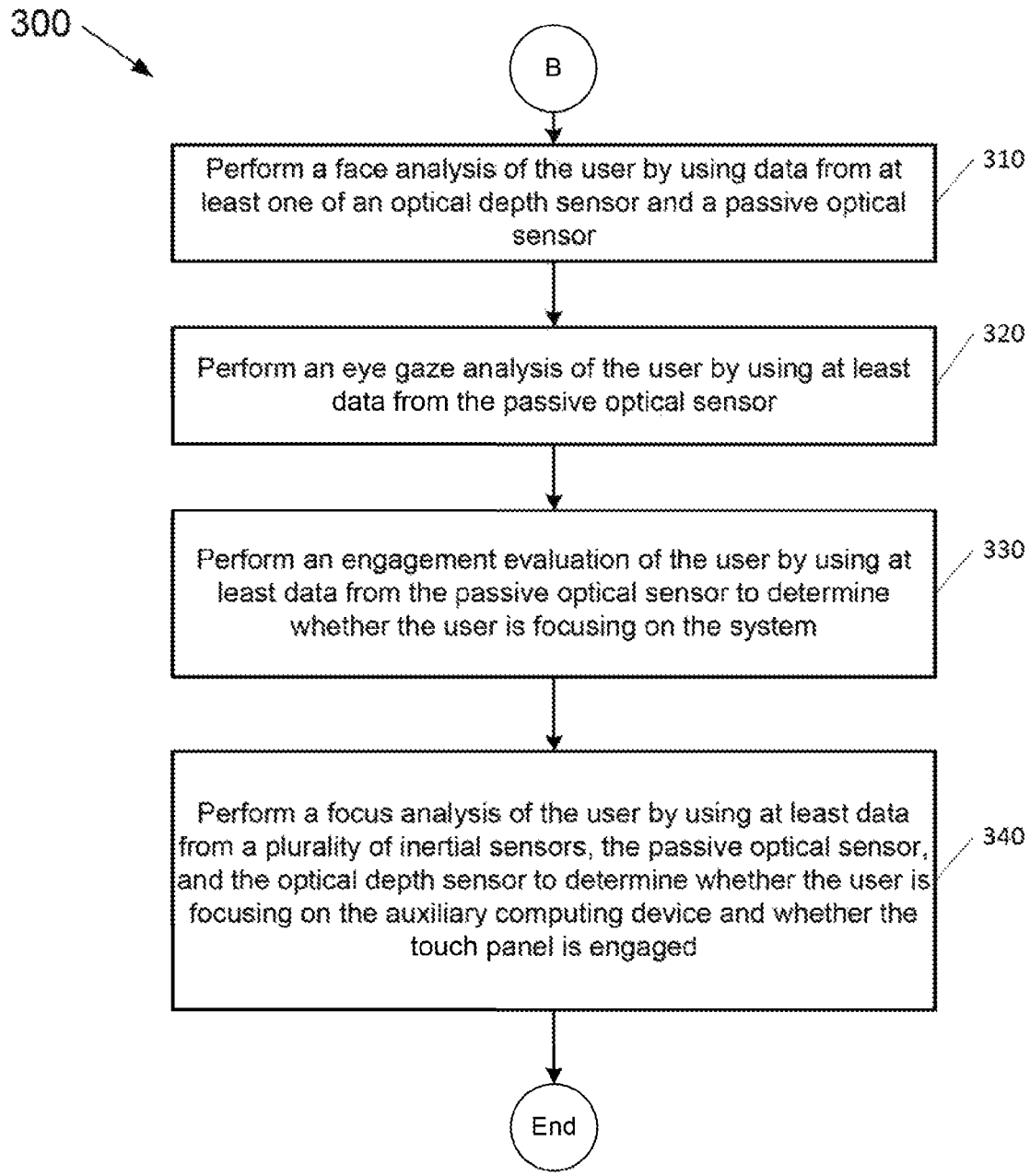
FIG. 5 illustrates a flow chart showing an example of a method for determining an attention engagement level of a user in accordance with an example implementation of the present disclosure.

FIG. 5 illustrates a flow chart showing an example of a method 300 for determining an attention engagement level of a user. In one example, the method 300 can be executed by the processor 30 of the computing device 15. Alternatively, the components executing the method 300 may be spread among multiple devices.

The method 300 begins at 310 where the processor 30 may perform a face analysis of the user by using data from at least one of an optical depth sensor and a passive optical sensor. For example, based on the received data the processor may identify the position, orientation, etc. of the user's face. At 320, the processor may perform an eye gaze analysis of the user by using at least data from the passive optical sensor. For example, based on the received data the processor may identify the position, orientation, etc. of the user's eyes. Thus, the system 5 may use the data from an optical depth sensor and/or a passive optical sensor to analyze the users' face and eye gaze so that the system 5 knows how the user is, looking at the elements of the system.

Next, the processor 30 may perform an engagement evaluation of the user by using at least data from the passive optical sensor to determine whether the user is focusing on the system 5 (at 330). The data from this and other sensors may be analyzed to confirm that the user is engaged with the elements of the system 5 (i.e., the 3D display, the computing device, the 3D objects, etc.). At 340, the processor 30 may perform a focus analysis of the user by using at least data from a plurality of inertial sensors, the passive optical sensor, and the optical depth sensor to determine whether the user is focusing on the auxiliary computing device arid whether the touch panel/display is engaged (e.g., by analyzing an input from the display). For example, the system 5 may analyze the data from these sensors to determine whether the user is looking at the computing device 15 and whether the device 15 is not being widely waived about (i.e., which may indicate that a user may not be focused on the device).

With continued reference to FIG. 4, the processor 30 may identify a pose of the user in relation to the computing device (at 220). In one example, the pose of the user may indicate how the user's hands hold the computing device 15 of the system 5.

Figure 6:
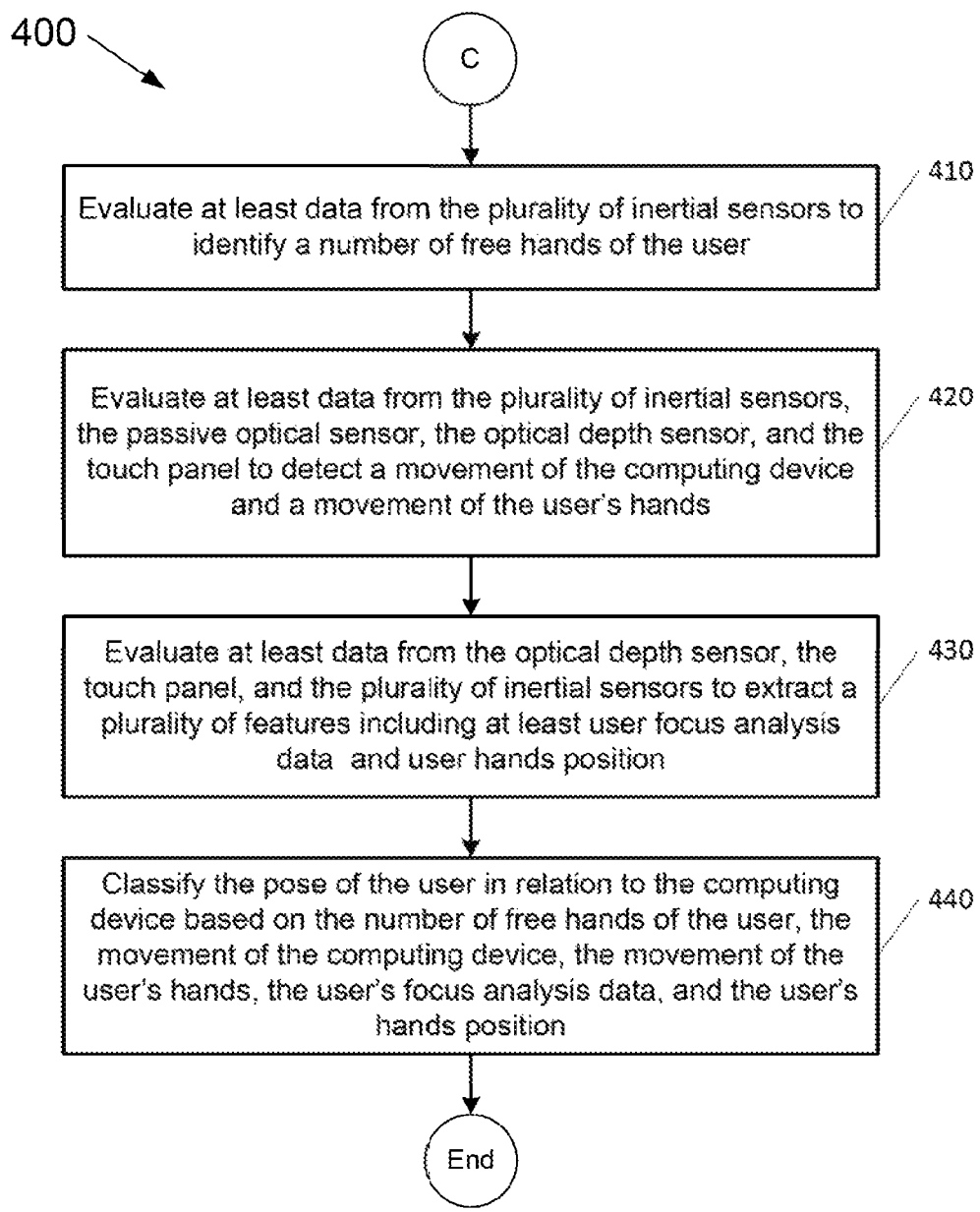
FIG. 6 illustrates a flow chart showing an example of a method for determining a pose of a user in relation to a computing device in accordance with an example implementation of the present disclosure.

FIG. 6 illustrates a flow chart showing an example of a method 400 for determining a pose of the user in relation to the computing device 15. In one example, the method 400 can be executed by the processor 30 of the computing device 15. Alternatively, the components for executing the method 400 may be spread among multiple devices.

The method 400 begins at 410. where the processor may evaluate at least data from the plurality of inertial sensors to identify a number of free hands of the user. For example, the processor may analyze the received data in relation to a stability threshold to identify the number of user hands that are occupied by the auxiliary computing device 15 (e.g., one or two hands). At 420, the processor 30 may evaluate at least data from the plurality of inertial sensors, the passive optical sensor, the optical depth sensor, and the touch panel to detect a movement of the computing device and a movement of the user's hands. For example, the processor may analyze the received data in relation to a proximity threshold to determine what is the current movement of the device 15 (e.g., is the device being held, is the device positioned on a surface, etc.) and the hands of the user (e.g., one hand is holding the device 15, the other hand is pointing towards a 3D object, both hands are holding the device 15, etc.).

At 430, the processor 30 may evaluate at least data from the optical depth sensor, the touch panel, and the plurality of inertial sensors to extract a plurality of features including at least user focus analysis data and user hands position. In one example, the user focus analysis data may be the data identified at block 340 of the method 400 (i.e., whether the user is focusing on the computing device 15 and whether the touch panel is engaged). Further, the user hand position may identify a specific hand position by the user (e.g., fist, pointing, "ok" sign, flat hand, etc.) based on the data from the optical depth sensor and the touch panel 58.

Next, at 440, the processor may classify the pose of the user in relation to the computing device based on the number of free hands of the user (or the number of free hands), the movement of the computing device, the movement of the user's hands, the user's focus analysis data, and the user's hands position. For example, the processor uses the available data to identify how the user is holding the device 15 (e.g., holds by two hands, holds by one on the edge, holds by one hand on the bottom, does not hold the device and both hands are free, etc.).

With continued reference to FIG. 4, the processor may determine an intention of the user in relation to the 3D virtual object based on the user's attention engagement level and the user's pose (at 230). In one, example, based on the user's behavior (i.e., level of engagement with system 5 and the pose in relation to the device 15), the processor 30 may determine what are the intentions of the user in relation to the 3D objects (e.g., the user intends to select an object, view an object, etc.).

After the processor 30 transitions the system 5 to an interaction mode based on the identified user intention, the processor 30 may execute an action with at the 3D virtual data object 155 by using a hand avatar based on the selected interaction mode and an identified gesture. In one example, the processor 30 may recognize user inputs provided through different gestures, and may perform a specific action with a 3D data object (e.g., navigating, pointing, saving etc.) based on the gesture and the previously selected interaction mode.

Figure 7:
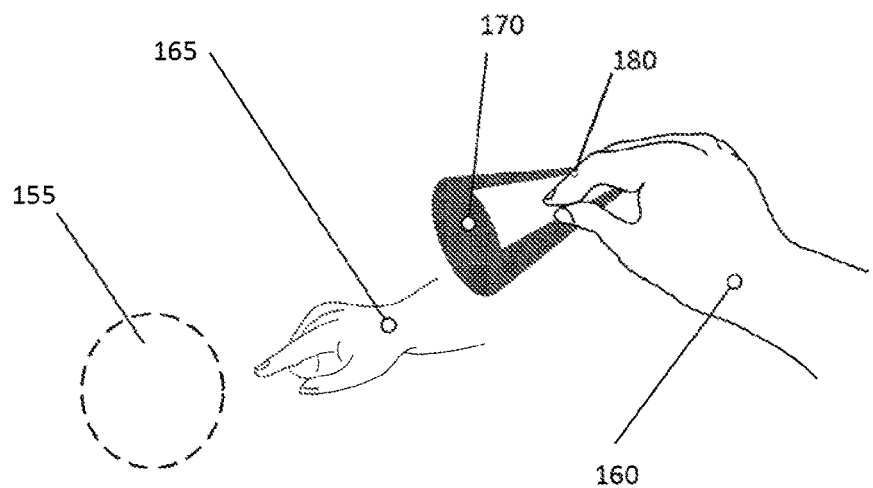
FIG. 7 illustrates an example of an action to couple a first user's view field of a 3D data visualization with a collaborator's view field of the 3D data visualization in accordance with an example implementation of the present disclosure.

FIG. 7 illustrates an example of an action to couple a first user's view field of 3D data visualization with a collaborator's view field of the 3D data visualization in the collaboration system 5. In one example, FIG. 7 illustrates a 3D visualization 155 displayed on a 3D display (not shown), a first user hand avatar 160, a second/collaborator user hand avatar 165, and a view field avatar 170 of the collaborator user. When the system 5 is in a navigation interaction mode (which is previously selected by the processor 30), the collaboration action engine 42 is to detect a change of view gesture 180 by the first user in order to perform view coupling. Thus, because the user is focusing on the 30 display 10 and the system 5 is already in a navigation interaction mode, the processor 30 "expects" a navigation action from the user and can easily perform the view coupling action.

In one example, the change of view gesture 180 by the first user is selecting the collaborators view field avatar 170 with the first user's hand avatar 160. Thus, view field coupling is an action that allows a user to gain the same view field as a target collaborator. When a user couples her view field with another collaborator, both users may share the same view field and same viewing experiences, such as the manipulations on the visualizations so that both may able to discuss any findings and issues related to the 3D data visualization at the same time. In addition to the view coupling action, the collaboration action engine 42 may also execute a follow action (e.g., where the collaborator's view field changes to match with the first user's view field), when the system is in a navigation interaction mode and the collaboration engine is to detect a follow gesture performed by the first user. The follow gesture may be a beckon gesture, including moving the avatar hand or fingers of the avatar hand in an inward direction, In other words, by executing the view field coupling action the first user follows a collaborator's view field, and by executing the follow action the collaborator follows the first user's view field.

Figure 8:
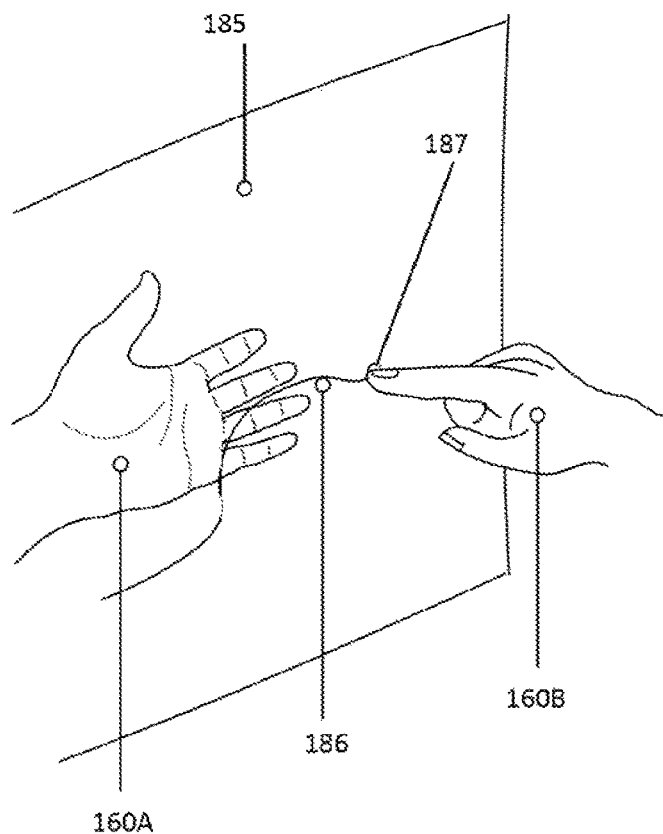
FIGS. 8 and 9 illustrate examples of an action to select a portion of a 3D data visualization that is collaboratively shown to a first user and a collaborator in accordance with an example implementation of the present disclosure.
Figure 9:
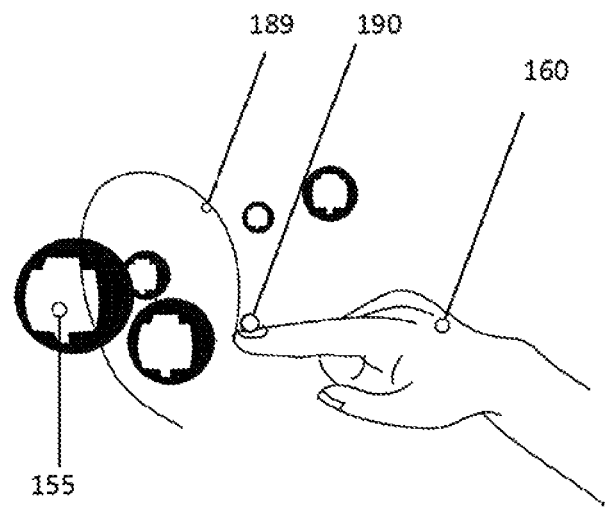

FIGS. 8 and 9 illustrate examples of an action to select a portion of the 3D data visualization that is collaboratively shown to a first user and a collaborator. In one example, FIG. 8 shows a first hand avatar 160A of a first user, a second hand avatar 160E of the first user, a plane 185 defined by the first hand avatar 160A, and a sketch line 186 on the plane 185 defined by the second hand avatar 160B. In the illustrated example, the computing device 15 may be placed on a surface (not shown) such that both hands of the user are free in order to direct hand avatars 160A/B. The user may see the 3D visualizations (not shown) on the 3D display 10 (not shown).

When the system 5 is in a selection interaction mode (which is previously selected by the processor 30), the collaboration action engine 42 is to detect a selection gesture 187 with a hand avatar by a first user in order to perform a selection action. In one example, the processor first detects a gesture with the first hand avatar 160A of the user to define a plane 185 in the 3D data visualization (not shown) and then detects a second gesture 187 (e.g., move of a finger in a space) with the second hand avatar 160B to identify a sketch line 186 that selects a specific portion of the 3D data visualization. Thus, the collaborator may see the selection performed by the user while the user is making that selection. In other examples, this action may also be used to measure the 3D data visualization objects or portions of the 3D data visualization objects. For instance, the plane 185 may be used to indicate an axis along which a measurement may occur.

In one example, FIG. 9 shows an hand avatar 160 of a first user, data visualizations 155, and a sketch line 189 defined by the hand avatar 160. When the system 5 is in a selection interaction mode (which is previously selected by the processor 30), the collaboration action engine 42 is to detect a selection gesture 190 with a hand avatar by a first user in order to perform a selection action. Thus, because the user is focusing on the 3D display 10 and the system 5 is already in selection interaction mode, the processor 30 "expects" a selection action from the user and can easily identify the multiple objects selection action by the user. In one example, the processor 30 may detect a drawing gesture 190 with the hand avatar 160 to identify a sketch line 189 that selects a specific portion of the 3D data visualization. Therefore, one of the collaborators may select an object, multiple objects, or a portion of an object, and may initiate another action (e.g., removing the object, etc.) while the selection action is being shared with the other collaborators via the system 5.

Figure 10:
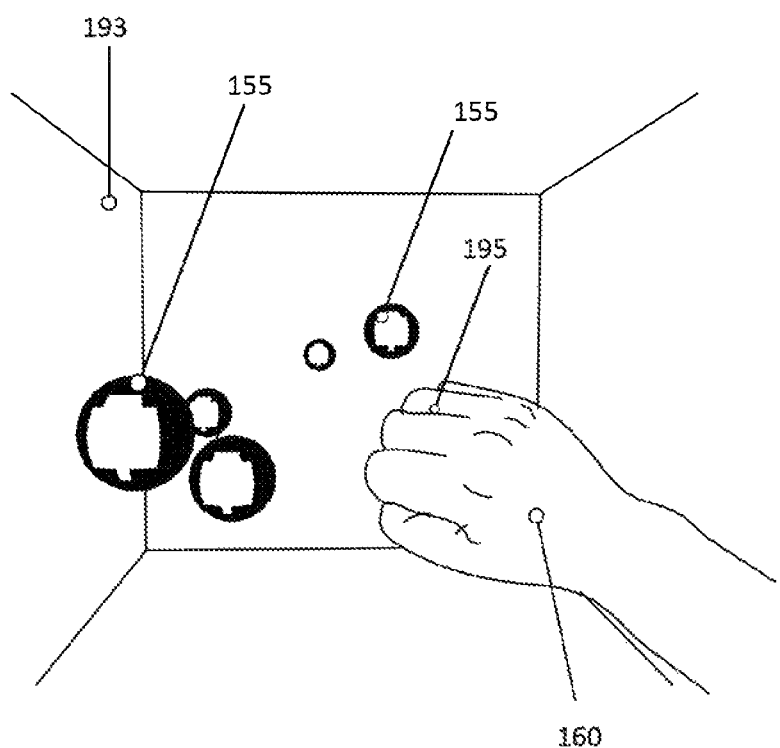
FIG. 10 illustrates an example of an action to save a collaborative view of a 3D data visualization in accordance with an example implementation of the present disclosure.

FIG. 10 illustrates an example of an action to save a collaborative view of a 3D data visualization. This may be helpful when several users collaboratively work on a set of 3D data visualizations and want to revisit a specific view of the data visualizations at a later point. In one example, this view remembering action may also be performed when moving the view field around for defining the path to share the viewing experience with other collaborators.

FIG. 10 shows 3D visualizations 155 in a 3D space 193 that are collaboratively seen by different users and a hand avatar 160. When the system 5 is in a save interaction mode (which is previously selected by the processor 30), the collaboration action engine 42 is to detect a save view gesture 195 with the hand avatar 160. In one example, the save view gesture 195 may be a fist gesture. Thus, the action of saving a collaborative view of the 3D visualization saves the current view of the 3D visualization with specific locations and orientations. These saved views may be visualized as stereoscopic images in the 3D space so that other users can perform a gesture to select them. Other actions related to the different interaction modes may also be performed by using the avatar hands of a user.

Figure 11:
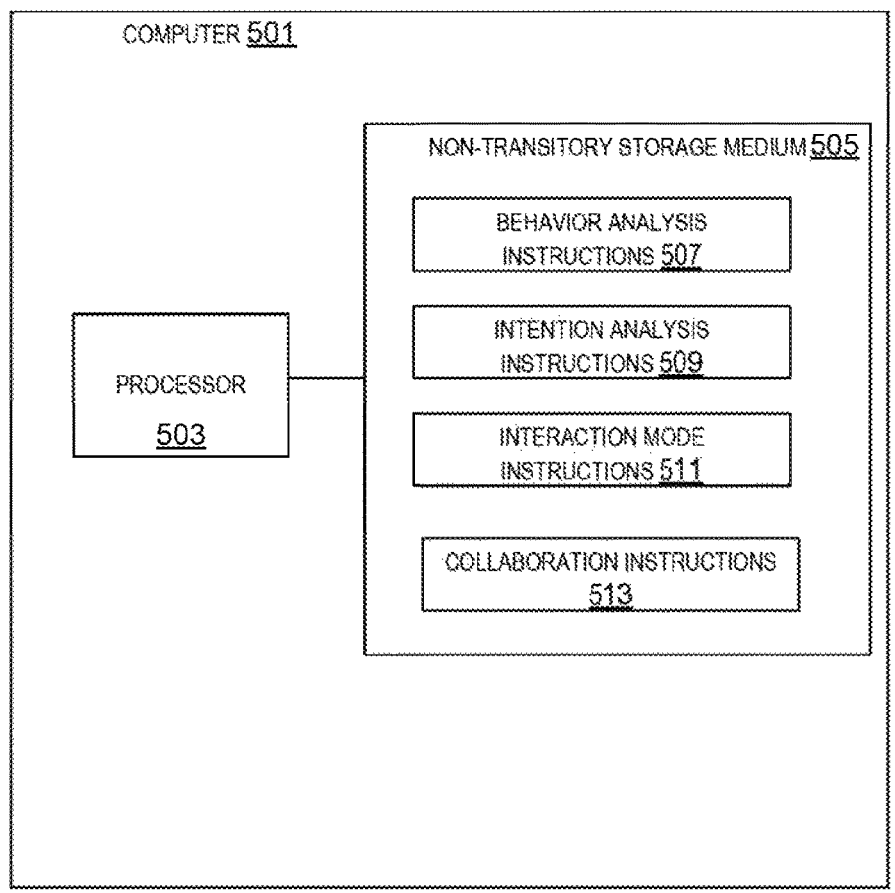
FIG. 11 is an example block diagram illustrating a computer-readable medium in accordance with an implementation of the present disclosure.

FIG. 11 illustrates a computer 501 and a non-transitory machine-readable medium 505 according to an example. In one example, the computer 501 maybe similar to the computing device 1 of the system 5 or may include a plurality of computers. For example, the computers may be server computers, workstation computers, desktop computers, laptops, mobile devices, or the like, and may be part of a distributed system. The computers may include one or more controllers and one or more machine-readable storage media. In one example, the computer may include a user interface (e.g., touch interface, mouse, keyboard, gesture input device, etc.).

Computer 501 may perform methods 100-400 and variations thereof. Additionally, the functionality implemented by computer 501 may be part of a larger software platform, system, application, or the like. Computer 501 may be connected to, a database (not shown) via a network. The network may be, any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

The computer 501 may include a processor 503 and non-transitory machine-readable storage medium 505. The processor 503 may be similar to the processor 30 of the computing device 15 and non-transitory machine-readable storage media 505 may be similar to the machine-readable storage media 37 of the device 15. Software stored on the non-transitory machine-readable storage media 505 and executed by the processor 503 includes, for example, firmware, applications, program data, filters, rules, program modules, and other executable instructions. The processor 503 retrieves from the machine-readable storage media 505 and executes, among other things, instructions related to the control processes and methods described herein.

The processor 503 may fetch, decode, and execute instructions 507-513 among others, to implement various processing. As an alternative or in addition to retrieving and executing instructions, processor 503 may include at least one integrated circuit (IC), other control logic, other electronic circuits, or combinations thereof that include a number of electronic components for performing the functionality of instructions 507-513. Accordingly, processor 503 may be implemented across multiple processing units and instructions 507-513 may be implemented by different processing units in different areas of computer 501.

The instructions 507-513 when executed by processor 503 (e.g., via one processing element or multiple processing elements of the processor) can cause processor 503 to perform processes, for example, methods 100-300, and/or variations and portions thereof, In other examples, the execution of these and other methods may be distributed between the processor 503 and other processors in communication with the processors 503.

For example, behavior analysis instructions 507 may cause processor 503 to perform behavior analysis of a user of a system including a plurality of auxiliary computing devices and a 3D display displaying a 3D virtual data object, at least two hand avatars of two different users, and a view field avatar. These instructions may function similarly to the techniques described in blocks 210 and 220 of method 200, and in more detail in the methods 300 and 400. For example, behavior analysis instructions 507 may cause processor 503 to identify an attention engagement level of the user, and to identify a pose of the user in relation to the computer 501.

Intention analysis instructions 509 may cause the processor 503 to perform an intention analysis of the user in relation to the 3D virtual data object based on the user's attention engagement level and the user's pose, These instructions may function similarly to the techniques described block 110 of method 100 and block 230 of the method 200. For example, based on the identified user's behavior (i.e., the level of engagement with system 5 and the pose in relation to a computing device), the intention analysis instructions 509 may cause the processor 503 to determine what are the intentions of the user in relation to the 3D object (e.g., the user intends to select an object, view an object, etc.).

Interaction mode instructions 511 may cause the processor 503 to automatically transition the system to an interaction mode based on the identified user intention. These instructions may function similarly to the techniques described block 120 of method 100. For example, the interaction mode instructions 511 may cause the processor 503 to transition the system to an interaction mode based on the identified user intention. In one example, the processor may automatically adjust the system to a specific interaction mode based on the user's intention.

Collaboration instructions 513 may cause the processor 503 to implement an action with the 3D virtual data object by using a hand avatar based on the interaction mode and an identified gesture. In one example, the visualization action instructions 513 may cause the processor 503 to recognize user inputs provided through different gestures, and to execute an action with a 3D object (e.g., selecting, navigating, etc,) by using a hand avatar based on the gesture and the previously selected interaction mode.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A collaboration system comprising:
    a three-dimensional (3D) display displaying a 3D data visualization, at least two hand avatars of two different users, and a view field avatar, wherein the two hand avatars are of a first user and a collaborator, and wherein the view field avatar is of the collaborator;
    a plurality of auxiliary computing devices;
    a behavior analysis engine to perform a behavior analysis of a user, the behavior analysis engine to:
        determine an attention engagement level of the user, and
        determine a pose of the user in relation to an auxiliary computing device;
    an intention analysis engine to determine an intention of the user in relation to the at least one 3D data visualization based on the user's attention engagement level and the user's pose;
    an interaction mode engine to:
        select, based on the determined user intention, an interaction mode of a plurality of interaction modes of the collaboration system, wherein each interaction mode is associated with a unique set of commands for interaction with the 3D data visualization, and
        automatically adjust the collaboration system to the selected interaction mode; and
    a collaboration engine to implement an action with the 3D data visualization based on the selected interaction mode and an identified gesture,
    wherein the action is to couple a first user's view field of the 3D data visualization with a collaborator's view field of the 3D data visualization, when the system is in a navigation interaction mode and the collaboration engine is to detect a change of view gesture performed by the first user, and
    wherein the change of view gesture by the first user is selecting the collaborator's view field avatar with the first user's hand avatar.

2. The collaboration system of claim 1, wherein the identified gesture indicates the implemented action while the collaboration system is in the selected interaction mode.

3. The collaboration system of claim 2, wherein another action is to select a portion of the 3D data visualization that is collaboratively shown to the first user and the collaborator, when the system is in a selection interaction mode and the collaboration engine is to detect a selection gesture with a hand avatar.

4. The collaboration system of claim 2, wherein another action is to save a collaborative view of the 3D data visualization, when the system is in a save interaction mode and the collaboration engine is to detect a save view gesture with a hand avatar.

5. A method comprising, by at least one processor:
identifying an intention of a user of a system in relation to a 3D virtual data object, the system including a plurality of computing devices and a 3D display displaying a 3D virtual data object at least two hand avatars of two different users, and a view field avatar;
selecting, based on the identified intention of the user, an interaction mode of a plurality of interaction modes of the system, wherein each interaction mode is associated with a unique set of commands for interaction with the 3D virtual data object;
transitioning the system to the selected interaction mode; and
executing an action with the 3D virtual data object by using a hand avatar based on the selected interaction mode and an identified gesture, comprising:
detecting a change of view gesture performed by a first user as the identified gesture, wherein the change of view gesture is a selection of a collaborator's view field avatar with the first user's hand avatar, and
coupling the first user's view field of the 3D virtual data object with a collaborator's view field of the 3D virtual data object when the system is in a navigation interaction mode.

6. The method of claim 5, wherein identifying the intention of a user in relation to the 3D virtual data object includes:
identifying an attention engagement level of the user;
identifying a pose of the user in relation to a computing device; and
determining the intention of the user in relation to the 3D virtual data object based on the user's attention engagement level and the user's pose.

7. The method of claim 5, further comprising: detecting a save view gesture with a hand avatar, and saving a collaborative view of the 3D virtual data object when the system is in a save interaction mode.

8. A non-transitory machine-readable storage medium encoded with instructions executable by, at least one processor, the machine-readable storage medium comprising instructions to:
perform a behavior analysis of a user of a system including a plurality of computing devices and a 3D display displaying a 3D virtual data object, at least two hand avatars of two different users, and a view field avatar, the behavior analysis to:
identify an attention engagement level of the user, and
identify a pose of the user in relation to a computing device;
identify an intention of the user in relation to the virtual data object based on the user's attention engagement level and the user's pose;
select, based on the identified intention of the user, an interaction mode of a plurality of interaction modes of the system, wherein each interaction mode is associated with a unique set of commands for interaction with the 3D virtual data object;
transition the system to the selected interaction mode; and
implement an action with the 3D virtual data object by using a hand avatar based on the selected interaction mode and an identified gesture, comprising:
detect a change of view gesture performed by a first user as the identified gesture, wherein the change of view gesture includes a selection of a collaborator's view field avatar with the first user's hand avatar, and
couple the first user's view field of the 3D virtual data object with a collaborator's view field of the 3D virtual data object when the system is in a navigation interaction mode.

9. The non-transitory machine-readable storage medium of claim 8, wherein the identified gesture indicates the implemented action while the collaboration system is in the selected interaction mode.

10. The non-transitory machine-readable storage medium of claim 8, wherein the plurality of interaction modes comprises a navigation interaction mode and a selection interaction mode.

11. The collaboration system of claim 1, wherein the plurality of interaction modes comprises a navigation interaction mode and a selection interaction mode.

12. The method of claim 5, wherein the identified gesture indicates the implemented action while the collaboration system is in the selected interaction mode.

13. The method of claim 5, wherein the plurality of interaction modes comprises a navigation interaction mode and a selection interaction mode.

* * * * *